US005477398A

United States Patent [19]

Ichikawa et al.

[11] Patent Number: 5,477,398
[45] Date of Patent: Dec. 19, 1995

[54] APPARATUS FOR EDITING DATA IN A SELECTED AREA ON A TRACK OF A TAPE RECORDING MEDIUM

[75] Inventors: Kei Ichikawa, Osaka; Makoto Gotou, Nishinomiya; Haruo Isaka, Yawata; Yoshio Sakakibara, Neyagawa, all of Japan

[73] Assignee: Matsushita Electric Industrial Co., Ltd., Osaka, Japan

[21] Appl. No.: 83,476

[22] Filed: Jun. 30, 1993

[30] Foreign Application Priority Data

Jul. 8, 1992 [JP] Japan .................................. 4-180845
Jul. 14, 1992 [JP] Japan .................................. 4-186477

[51] Int. Cl.⁶ ............................................. G11B 27/036
[52] U.S. Cl. ............................. 360/13; 360/10.2; 360/48
[58] Field of Search ......................... 360/13, 14.2, 14.1, 360/18, 77.14, 77.15, 19.1, 40, 48, 51, 53, 10.2–10.3

[56] References Cited

U.S. PATENT DOCUMENTS 4,533,963  8/1985  Nakano et al. ..................... 364/19.1
4,920,435  4/1990  Yamazaki ........................... 360/18 X
5,057,949  10/1991  Suga et al. ....................... 360/10.2 X
5,084,786  1/1992  Konno et al. ....................... 360/13
5,124,853  6/1992  Kashida et al. ................... 360/18 X

*Primary Examiner*—Aristotelis Psitos
*Assistant Examiner*—James T. Wilson
*Attorney, Agent, or Firm*—Wenderoth, Lind & Ponack

[57] ABSTRACT

An editing apparatus is for use with a tape-form recording medium in which a tracking pilot signal and several synchronizing blocks each of which contains a synchronizing signal, a synchronizing signal number and a recording mode data are multiplex-recorded into a first recording area of each track which has a plurality of recording areas. Using the synchronizing signal and the synchronizing signal number, a pilot sampling signal for determining the timing of sampling the pilot signal and an editing timing signal for determining the recording location in a desired recording area following the first recording area are produced. Using the recording mode data, the discrimination of the current recording mode is carried out. After the tracking control is executed through sampling the tracking pilot signals from adjacent tracks at timing of the pilot sampling signal, a data signal is recorded into the desired recording area after the first recording area according to the editing timing signal.

9 Claims, 6 Drawing Sheets

|  | SP mode | LP mode |
|---|---|---|
| Track pitch (μm) | 10 | 7 |
| Tape speed (mm/s) | 22 | 15.4 |
| Applied head | 1a, 1b with 12μm head width | 1c, 1d with 9μm head width |
| Recording mode data (Binary code) | 01 | 10 |

1

APPARATUS FOR EDITING DATA IN A SELECTED AREA ON A TRACK OF A TAPE RECORDING MEDIUM

BACKGROUND OF THE INVENTION

1. Field of the invention

The present invention relates to a recording/reproducing apparatus for recording and reproducing signals of video, audio or other information data on and from a tape-like recording medium such as a magnetic recording tape, and particularly to a recording/reproducing apparatus capable of editing the recorded data. The editing is a function of varying the recorded data including data replacement or erase in a given recording area and additional data recording in an area continuously succeeding a given recording area.

2. Description of the Prior Art

A variety of magnetic recording/reproducing apparatuses such as the video tape recorders (referred to as VTRs hereinafter) utilizing magnetic recording tapes have been developed and practically used. They have recently been reduced in size, improved for high density recording, and implemented for digital recording. It is essential for increasing the recording density and maintaining the compatibility to perform accurate tracking action of the magnetic head. To realize the accurate tracking action, a tracking control method called ATF (Automatic Track Finding) has been introduced for use in a VTR in which a pilot signal is mixed into a data signal during recording and utilized for correct tracking action during retrieval of the data signal. A conventional magnetic recording/reproducing apparatus using such a tracking control method will now be described.

In a recording mode, a row of oblique recording tracks are formed on a magnetic recording tape by a magnetic head mounted on a rotary cylinder. A recording signal fed to the magnetic head contains a data signal mixed with pilot signals for tracking control. More specifically, two different pilot signals having frequencies of f1 and f2 respectively are recorded alternately onto every two recording tracks. Usually, the frequency of each pilot signal is selected from one to four low frequencies which will hardly interfere with the data signal.

The action of tracking the recording tracks in a reproducing mode will be explained. The magnetic head tracing a target track reads a segment of the data signal and simultaneously detects two pilot signal components f1 and f2 from the adjacent recording tracks at both sides of the target track. The relative position of the magnetic head to the target track can hence be examined through comparing the amplitudes of the two pilot components f1, f2. In more detail, the two pilot components f1, f2 are extracted through a bandpass filter and converted by an amplitude detection circuit to their respective DC components depending on their amplitudes. The two DC components are then compared by a subtraction circuit. A resultant output of the subtraction circuit is a tracking error signal exhibiting a positional difference between the magnetic head and the target track to be traced. Upon receiving the tracking error signal, a capstan motor control circuit for controlling the feeding of the tape adjusts a capstan motor to control the tape running so that the magnetic head traces along the center of the target track.

For replacement of the recorded data signal on a magnetic recording tape with another data signal (which will hereafter be referred to as insert editing), the reproducing mode is shifted to the recording mode at a start point of rewriting and the new data signal is recorded while the existing data signal is being erased. More specifically, the new data signal is recorded onto the recording tape track by track at the timing determined by a signal from a rotating position detecting sensor which is generally called PG (Pulse Generator) mounted on the rotary cylinder.

According to the conventional magnetic recording/reproducing apparatus, since the tracking is conducted using the pilot signals mixed into the data signal, no pilot signals will be given during the insert editing action. This will result in failure in the time matching between a current track and a preceding track at the end of editing, sequence error of the pilot signals carried on the data signal, and remaining of track which has imperfect track width. In case that the apparatus has several recording modes such, for example, as a standard play (referred to as SP hereinafter) mode and a long play (referred to as LP hereinafter) mode, the conventional apparatus gives no signal for indicating the recording mode of recording tracks during the editing. Thus it may happen that the apparatus edits the tracks in a different recording mode. Further, since the conventional apparatus determines the start point of recording on each track for insert editing action by the signal from the PG, the existing data signal on the track will hardly be erased in entirety due to mechanical non-uniformity of the rotary cylinder and setting error of the PG. The remaining, non-erased data may result in malfunction of the entire apparatus. Also, excessive erasing in the same track will likely be caused during partial rewriting. Particularly, editing with another recording/reproducing apparatus may create much errors, thus degrading the performance of the apparatus.

SUMMARY OF THE INVENTION

An object of the present invention is to provide an editing apparatus for editing information recorded in a tape recording medium with a high positioning accuracy.

According to the present invention, a tape recording medium has formed thereon a plurality of recording tracks each being divided into a plurality of recording areas including a first recording area counted from a beginning end of each recording track, the first recording area on a specific recording track of the plurality of recording tracks has recorded therein a plurality of synchronizing blocks each containing a synchronizing signal and a synchronizing signal number which indicates a sequential order of each synchronizing block in the first recording area, adjacent recording tracks adjacent to the specific recording track at opposite sides of the specific recording track have recorded therein a pilot signal used for tracking control.

An editing apparatus of the invention comprises: recording information signal generating means for generating a recording information signal to be recorded for editing; recording and reproducing means including a recording and reproducing head and operable in a first mode in which the head scans the first recording area of the specific recording track for reproducing the synchronizing blocks from the first recording area of the specific recording track and the pilot signal detected due to crosstalk from the adjacent tracks to thereby obtain a reproduced signal and in a second mode in which the head records the recording information signal in a given editing area on the recording medium; editing control means for operating the recording and reproducing means in the first mode to obtain the reproduced signal, the editing control means further generating an editing area signal indicative of the given editing area; synchronizing block detecting and decoding means for detecting from the reproduced signal the synchronizing signal of each of the reproduced synchronizing blocks and decoding the synchronizing signal number of each of the reproduced synchronizing blocks and for examining a sequence of the reproduced synchronizing blocks by checking the synchronizing signal number until a specific synchronizing signal number is obtained, the synchronizing block detecting and decoding means outputting the specific synchronizing signal number when a predetermined number of synchronizing blocks have been reproduced in a predetermined sequence; tracking error detecting means responsive to the specific synchronizing signal number from the synchronizing block detecting and decoding means for sampling the reproduced pilot signal to obtain a tracking error signal indicative of a tracking error of the head; tracking control means responsive to the tracking error signal for controlling a transfer of the recording medium to eliminate the tracking error; and editing timing generating means responsive to the specific synchronizing signal number from the synchronizing block detecting and decoding means and the editing area signal from the editing control means for generating an editing timing signal, wherein the recording and reproducing means is responsive to the editing timing signal for operating in the second mode to record with the head the recording information signal in the editing area.

Preferably, each synchronizing block also contains a recording mode data indicative of a recording mode in which the specific recording track has been recorded. In this modification, the editing apparatus may further comprise an editing stopping means for comparing the reproduced recording mode data with an edit recording mode data and stopping editing when the reproduced recording mode data is different from the edit recording mode data.

According to the above editing apparatus, the pilot signal is retrieved from the first recording area of a track even during the editing, so that positional matching between the current track and the preceding track after completion of the editing action will be ensured.

The timing for starting a recording action on a given track of a recording tape during editing is determined by the synchronizing block in the first recording area of the given track itself, so that the relative position of the head to the given track can be maintained with accuracy.

The sampling of the pilot signal is accurately controlled by the synchronizing block stored on the tape, so that the recording area for storage of the pilot signal can be minimized, thus enhancing the utilization efficiency of the tape recording surface.

Also, when recording mode data is contained in each synchronizing block in the first recording area, a signal indicating the recording mode of recording tracks will be given even during the editing. Accordingly, the apparatus can avoid such an action that edits the tracks with a different recording mode. It is reasonable that the first area which is not rewritten in the editing contains information concerning the track because the apparatus needs not rewrite the information concerning the track at every editing.

DESCRIPTION OF THE PREFERRED EMBODIMENT

Figure 1:
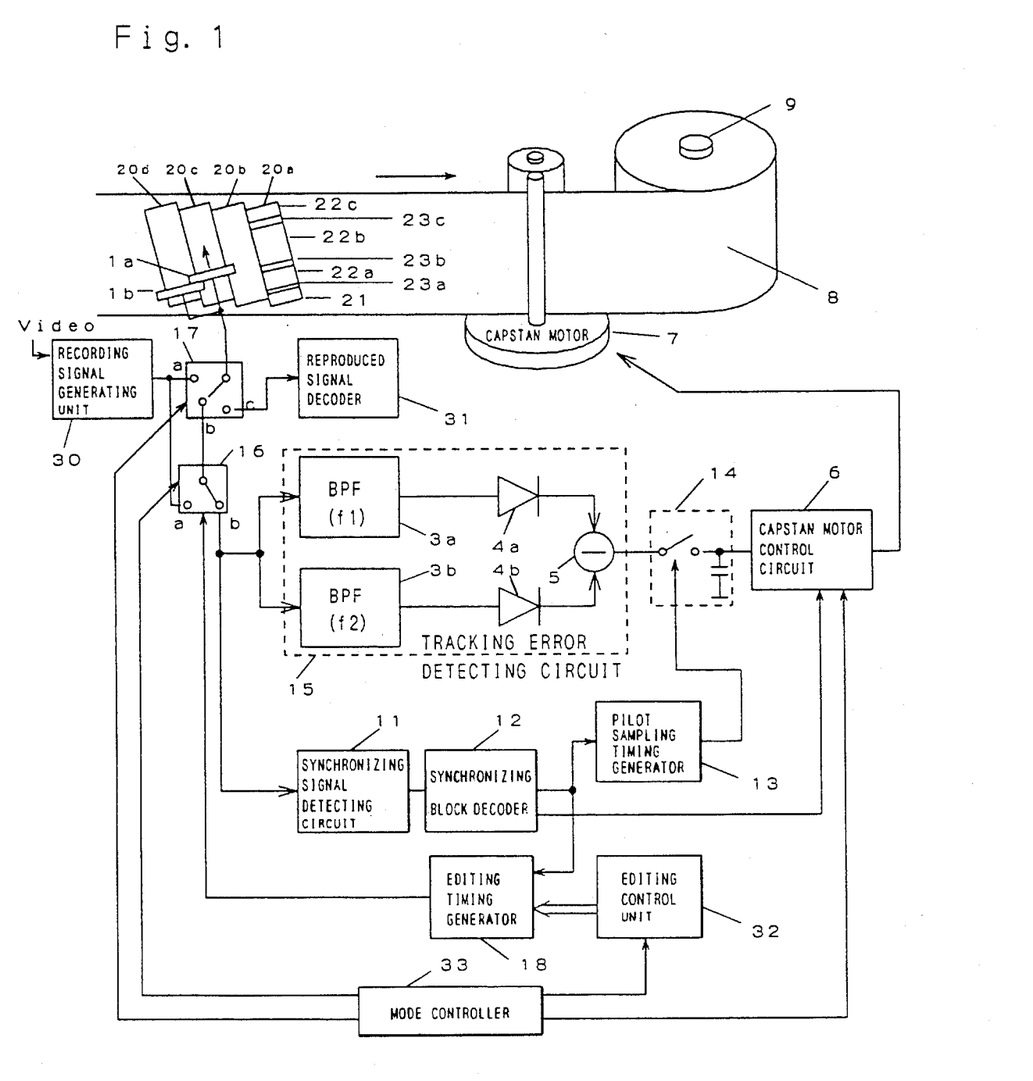
FIG. 1 is a schematic block diagram showing a tape recording medium editing apparatus as an embodiment of the present invention.
Figure 2:
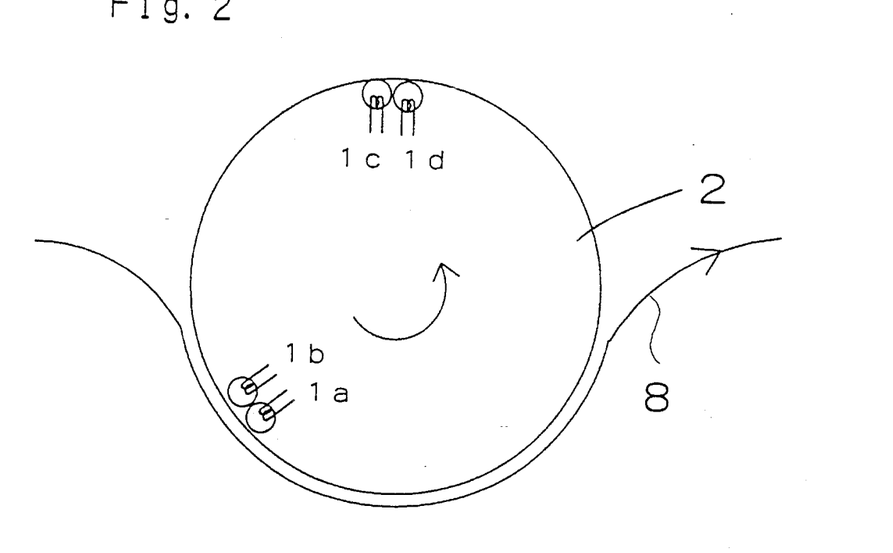
FIG. 2 is a view showing an arrangement of magnetic heads on a rotary cylinder of the apparatus.
Figure 9:
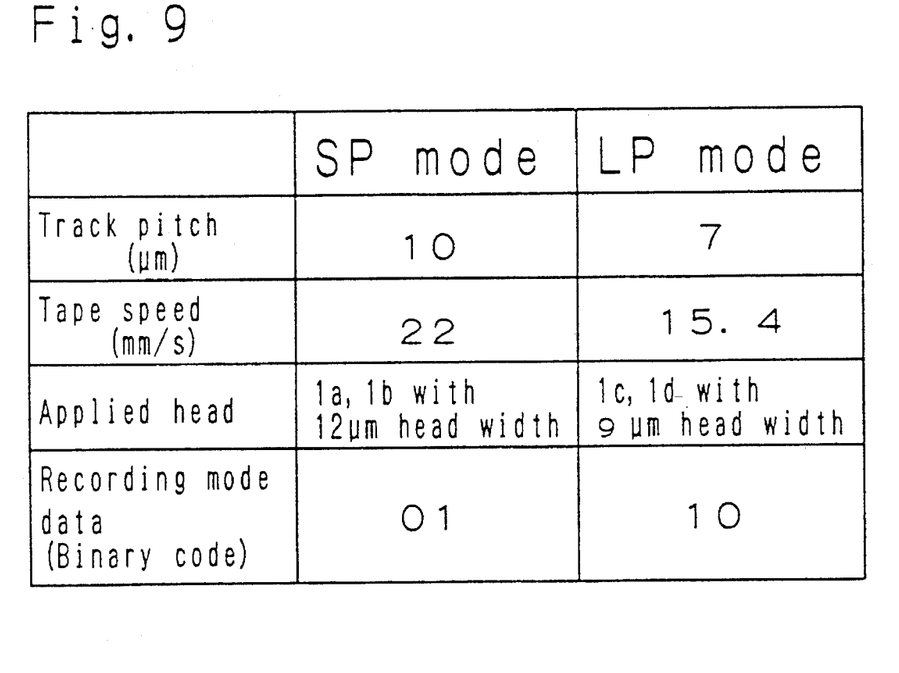
FIG. 9 is a table showing characteristics of the operating modes of the apparatus shown in FIG. 1.

FIG. 1 is a schematic block diagram of a tape recording medium editing apparatus according to one embodiment of the present invention. FIG. 2 is a view showing an arrangement of magnetic heads on a rotary cylinder of the apparatus. In this embodiment, the apparatus is operable in any two recording modes, the SP and the LP modes. The characteristics of the two recording modes are shown in FIG. 9. As shown in FIG. 2, four magnetic heads 1a, 1b, 1c and 1d are mounted on a rotary cylinder 2. Heads 1a, 1b are disposed closely to each other for the SP mode and heads 1c, 1d are disposed closely to each other for the LP mode. A tracking error detecting circuit 15 comprises two bandpass filters 3a, 3b for extracting the first and second pilot signals for tracking control use, two amplitude detecting circuit 4a, 4b for detecting the amplitudes of the first and second pilot signals, respectively, and a subtraction circuit 5 for obtaining an amplitude difference between outputs of the first and second amplitude detecting circuits 4a, 4b to obtain the tracking error signal. A capstan motor control circuit 6 is provided for controlling the action of a capstan motor 7. The capstan motor 7 is provided for controlling the transfer of a magnetic recording tape 8. A tape winding real 9 is provided for winding the magnetic recording tape 8. Also, there are arranged an operation mode switch circuit 17 for switching the operation mode among a recording mode, a reproducing mode and an editing mode, a synchronizing signal detecting circuits 11 for detecting the synchronizing signal in the synchronizing block mentioned later, a synchronizing block decoder 12 for decoding the data in the synchronizing block, an editing timing generator 18 for generating a timing signal for editing, an editing control unit 32 for indicating an editing area, an editing switch 16 for switching the operation mode from the reproducing mode to the editing mode, a pilot sampling timing generator 13 for generating a pilot sampling timing signal for sampling a tracking error signal from the subtraction circuit 5 in response to a synchronizing signal number from the synchronizing block decoder 12, a sample and hold circuit 14 for sampling and holding the tracking error signal from the subtraction circuit 5 in response to the pilot sampling timing signal from the pilot timing signal generator 13, a recording signal generating unit 30 for generating a data signal to be recorded, a reproduced signal decoder 31 for decoding a reproduced data signal from the head 1a, 1b, and a mode controller 33 for controlling the operation mode of the apparatus. This apparatus records and reproduces data of two tracks simultaneously with the two channel magnetic heads 1a, 1b for the SP mode or 1c, 1d for the LP mode.

The action of recording, reproducing, and editing modes will be explained.

Figure 3:
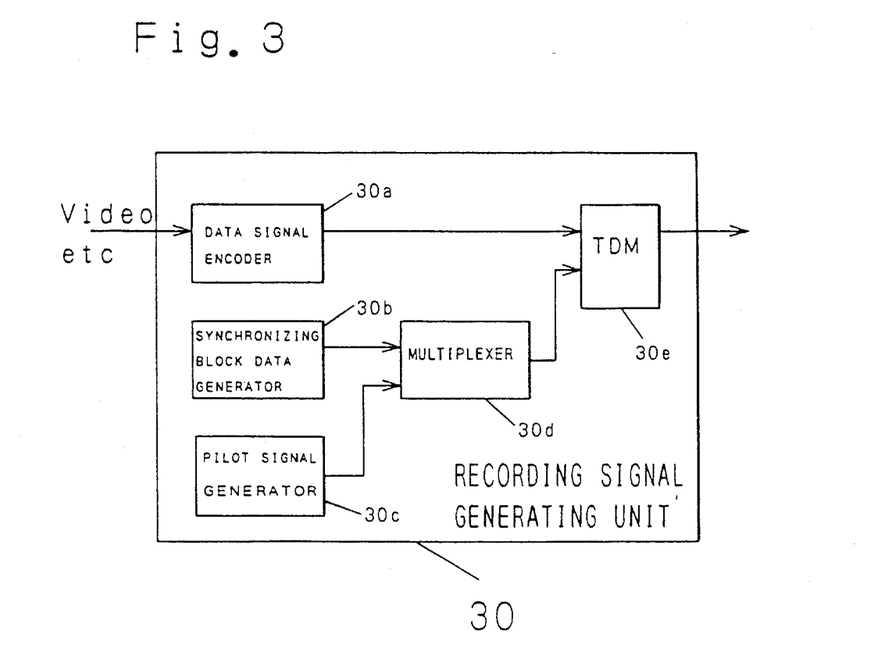
FIG. 3 is a block diagram of a recording signal generating unit of the apparatus.

In the recording mode to record tracks each having four areas 21, 22a, 22b, 22c separated by three gaps 23a, 23b, 23c such as 20a shown in FIG. 1, the magnetic head 1a is connected to a terminal "a" of the operation mode switch circuit 17 so as to receive a data signal from the recording signal generating unit 30 according to a command from the mode controller 33. FIG. 3 shows a block diagram of the recording signal generating unit 30. When the head 1a is running at the first recording area 21, a TDM (Time division multiplexer) 30e in the recording signal generating unit 30 selects the signal from a multiplexer 30d as an input. At this time a synchronizing block data generator 30b first generates a synchronizing signal which is a fixed data pattern such, for example, as "1000110111". Then, the synchronizing block data generator 30b generates a synchronizing signal number "1". Then, the synchronizing block data generator 30b generates a recording mode data "01" which indicates the recording mode of this track. In this explanation, the mode is the SP mode now, so the recording mode data is set "01" based on FIG. 9. One synchronizing block has these three data, i.e., the synchronizing signal, the synchronizing signal number and the recording mode data. Next, the synchronizing block data generator 30b generates a synchronizing signal again, and then sequentially generates a synchronizing signal number "2", and a recording mode data "01". The synchronizing block data generator 30b repeats this signal and data generation until the synchronizing signal number becomes "5". These synchronizing block data will be recorded in the first recording area of the track. A pilot signal generator 30c generates two different kinds of pilot signals having frequencies f1 and f2, respectively, and sends the two pilot signals alternately at every two tracks to the multiplexer 30d. The multiplexer 30d mixes the synchronizing block data from the synchronizing block data generator 30b and the pilot signal from the pilot signal generator 30c, and sends the mixed data to the TDM 30e. When the pilot signal generator 30c does not generates a pilot signal at every two tracks, the multiplexer 30d sends the synchronizing block data from the synchronizing block data generator 30b to the TDM 30e directly. The TDM 30e sends the data signal from the multiplexer 30d to the head 1a and this data signal is recorded into the first recording area of the track on the tape recording medium 8.

Figure 4:
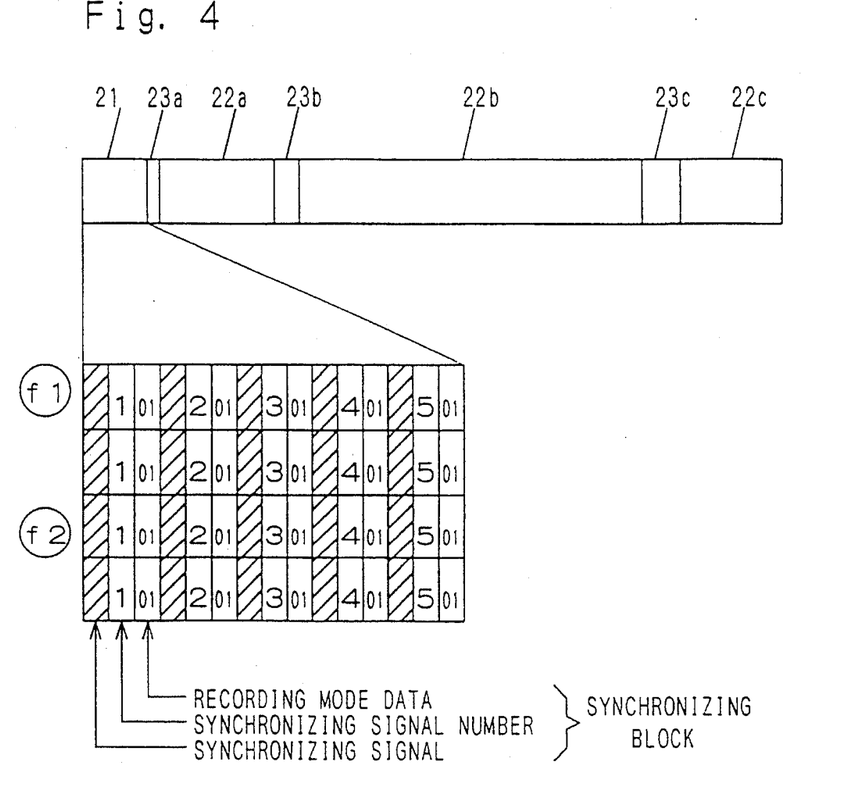
FIG. 4 is a diagram showing recording tracks according to the embodiment.

Next, the TDP4 30e in the recording signal generating unit 30 selects the signal from a data signal encoder 30a which encodes the inputted data. When the head 1a is running the second recording area 22a, the data signal encoder 30a receives digital audio signal data, encodes it and sends the coded data to the TDM 30e. The TDM 30e sends the coded audit data signal from the data signal encoder 30a to the head 1a and this data signal is recorded into the second recording area 22a of the track on the tape recording medium 8. In the same manner, digital video signal data is recorded into the third recording area 22b and index signal data which indicates a track position in the tape is recorded in the fourth recording area 22c. A gap is inserted between each adjacent two recording areas by the TDM 30e to isolate the recording areas from each other. The recording signal generating unit 30 sends data independently to the head 1a and 1b. So, the magnetic head 1b is simultaneously connected to the terminal "a" of the operation mode switch circuit 17 so as to receive and record another data signal onto an adjacent track. Through above mentioned operation, the tracks which have the allocation of the recording areas as shown in FIG. 4 are constructed. A plurality of synchronizing blocks are recorded in the first recording area 21 located at the beginning end of the track. Each synchronizing block contains a synchronizing signal, a synchronizing signal number which regularly increases along the synchronizing blocks to identify the order of each synchronizing block within the first recording area on each track, and a recording mode data indicating the recording mode of the track. The first recording area 21 of each of every two tracks contains also a pilot signal for tracking control use. Two different kinds of the pilot signals having different frequencies f1 and f2 respectively are recorded alternately every two tracks. Other information recording areas 22a to 22c of a track follow the first recording area 21 as shown in FIG. 4. Any two adjacent recording areas in the track are separated from each other by a gap 23a, 23b or 23c. On a magnetic recording tape 8, a row of consecutive, parallel recording tracks 20a, 20b, 20c and 20d are formed diagonally as shown in FIG. 1.

In the reproducing mode, the operation mode switch circuit 17 is shifted to a terminal "c" by a command of the mode controller 33 for transmission of a reproduced signal from the head 1a to the reproduced signal decoder 31 where the reproduced signal is decoded. Also, another reproduced signal from the head 1b is simultaneously transferred to the reproduced signal decoder 31 where it is decoded.

The operation in the editing mode will now be explained in which the data signal recorded in the second, third or fourth recording areas on a track as shown in FIG. 4 is replaced with another data signal. The operation mode switch circuit 17 is shifted to a terminal "b" by a command of the mode controller 33 for communication with the magnetic head 1a. Upon starting a scanning action of the head 1a along the track 20c, the editing switch 16 is turned to a terminal "b" by a command of the mode controller 33 for transmission of a reproduced signal from the head 1a. The reproduced signal supplied from the head 1a contains two pilot signal components f1, f2 detected due to crosstalk from the respective adjacent tracks 20b, 20d at both sides of the track 20c. The two pilot components f1, f2 are extracted from the reproduced signal by the bandpass filters 3a, 3b and converted by the amplitude detecting circuits 4a, 4b to two DC components, respectively. The two DC components are then fed to the subtraction circuit 5 where they are compared with each other to produce a tracking error signal.

Figure 5:
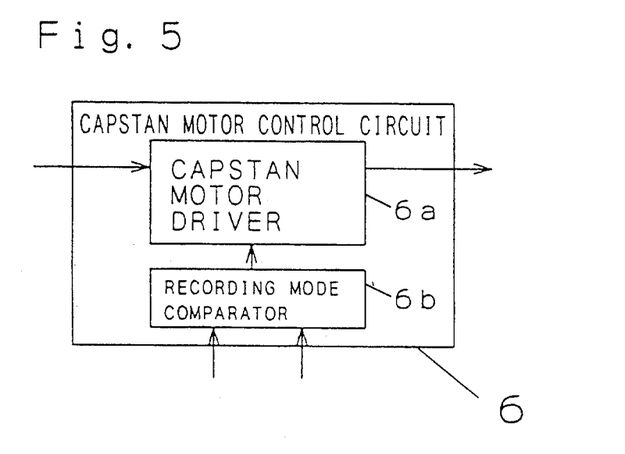
FIG. 5 is a block diagram of a capstan motor control circuit of the apparatus.
Figure 6:
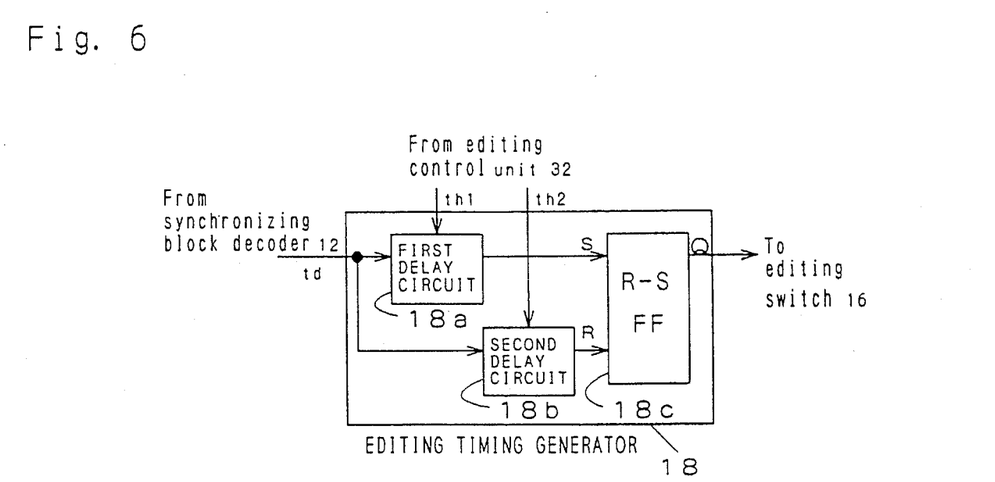
FIG. 6 is a block diagram of an editing timing generator of the apparatus.
Figure 7:
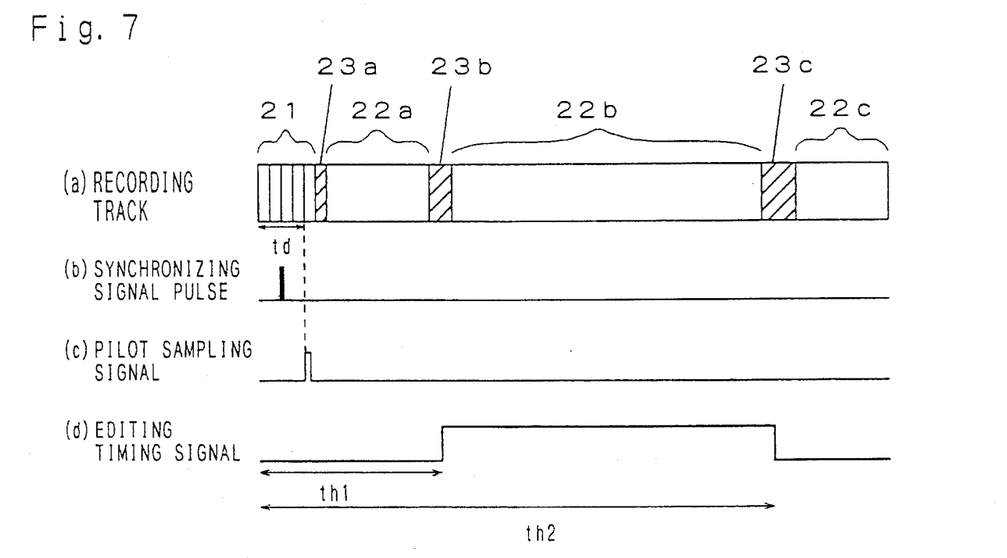
FIG. 7 is a time chart of the signals during insert editing action according to the embodiment.

The succeeding operation will be explained with reference to FIGS. 5, 6 and 7. The reproduced signal from the head 1a is fed also to a synchronizing signal detecting circuit 11 where the synchronizing signal in each synchronizing block in the first recording area 21 is detected. The synchronizing signal detecting circuit 11 generates, upon detection of any synchronizing signal, a pulse signal as shown in FIG. 7(b). In this example, the synchronizing signal detecting circuit 11 succeeds to detect the synchronizing signal in the third synchronizing block from the beginning end of the track. After detecting the synchronizing signal, the synchronizing signal number and the recording mode data after the detected synchronizing signal are fed to a synchronizing block decoder 12 and decoded. The synchronizing block decoder 12 starts to count the synchronizing signal number following the detected synchronizing signal to confirm the detection. In this example, the synchronizing block decoder counts the synchronizing signal number "3", "4", "5" until getting the synchronizing signal number "5". Simultaneously, the synchronizing block decoder 12 gets the recording mode data "01". The synchronizing signal number "5" corresponds the scanning time delay of the detected synchronizing signal from the beginning end of the track as shown in FIG. 7(a) in which the delay is denoted by td. The synchronizing signal number "5" is converted to the time delay information td and fed to a pilot sampling timing generator 13.

In the meantime, the decoded recording mode data is fed to the capstan motor control circuit 6. The capstan motor control circuit 6 has a recording mode comparator 6b shown in FIG. 5 where the detected recording mode data is compared with a present edit recording mode data given from the mode controller 33. If the compared result is "Not matching" which shows the present scanning tracks are not correct editing area, the recording mode comparator 6b outputs a "stop" command to a capstan motor driver 6a and the capstan motor driver 6a responsive to the stop command stops the capstan motor 7 immediately.

The pilot sampling timing generator 13, upon receiving the value td from the synchronizing block decoder 12, generates a pilot sampling signal as shown in FIG. 7(c). In response to the pilot sampling signal, a sample and hold circuit 14 starts sampling the tracking error signal supplied from the tracking error detecting circuit 15. A sampled tracking error signal from the sample and hold circuit 14 is transferred to the capstan motor control circuit 6 to control the speed of the tape 8 so that the magnetic head 1a accurately scans along the target track 20c.

The time delay information td from the synchronizing block decoder 12 is fed also to an editing timing generator 18. For rewriting data in a particular recording area, start and end locations of the area have to be determined. As illustrated in FIG. 6, an editing control unit 32 has already sent a start time location th1 to a first delay circuit 18a and an end time location th2 to a second delay circuit 18b in the editing timing generator 18 according to a command of the mode controller 33. When the first delay circuit 18a receives the time delay information td from the synchronizing block decoder 12, it calculates the value (th1-td), and after the time delay (th1-td) generates a first delay pulse signal. In the same manner, when the second delay circuit 18b receives the time delay information td from the synchronizing block decoder 12, it calculates the value (th2-td), and after the time delay (th2-td) generates a second delay pulse signal. The first and second delay pulse signals are sent to an R-S flip-flop (FF) circuit 18c which produces an editing timing signal as shown in FIG. 7(d). It is now assumed that the editing timing signal is for rewriting of data in the third recording area 22b of the track. The editing timing signal is fed to the editing switch 16. When the editing timing signal is at "H" (high) level, the editing switch 16 is turned from the terminal "b" to the terminal "a" for transmitting a rewriting data signal which are sent from the recording signal generating unit 30 to the magnetic head 1a through the operation mode switch circuit 17. As the result, the existing data signal in the third recording area 22b is replaced with the rewriting data signal.

While the rewriting data signal is fed to the magnetic head 1a through the editing switch 16 having been turned to the terminal "a" by the editing timing signal of the editing timing generator 18, another rewriting data signal is concurrently supplied to the magnetic head 1b through the editing switch 16. Accordingly, the existing data signals stored in the third recording areas 22b of the two adjacent tracks can be replaced with new data signals at approximately the same time. The magnetic head 1b is arranged adjacent to the magnetic head 1a so that its relative position to the head 1a remains unchanged. This allows the head 1b to trace the track 20d with equal accuracy while the head 1a is accurately scanning along the track 20c. Although FIG. 7 explains the rewriting of data in the third recording area, the other recording areas of the track will be rewritten in the same manner.

Figure 8A:
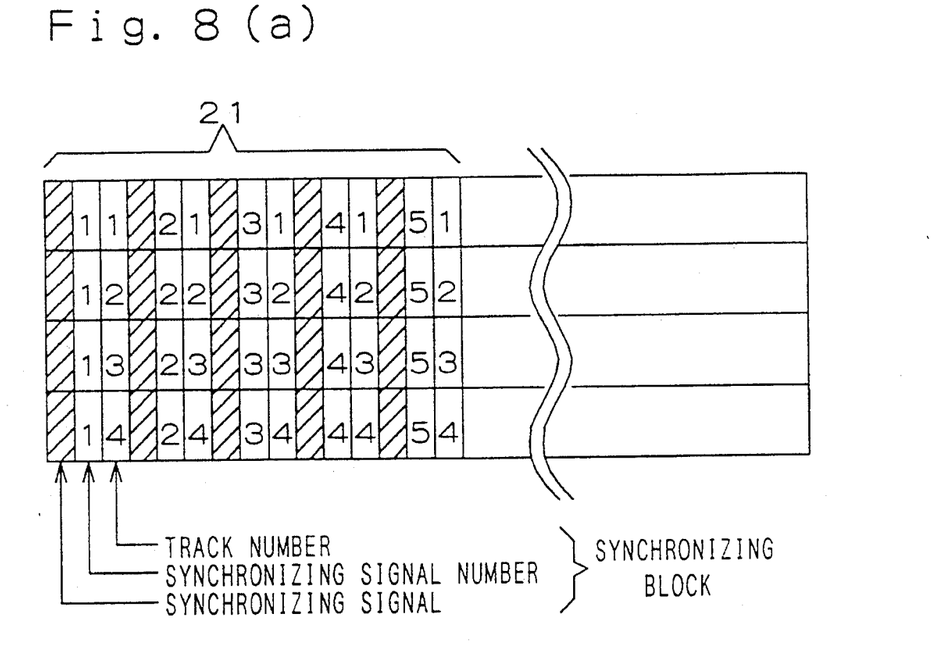
FIG. 8(a) and (b) are diagrams showing recording tracks according to other embodiments.
Figure 8B:
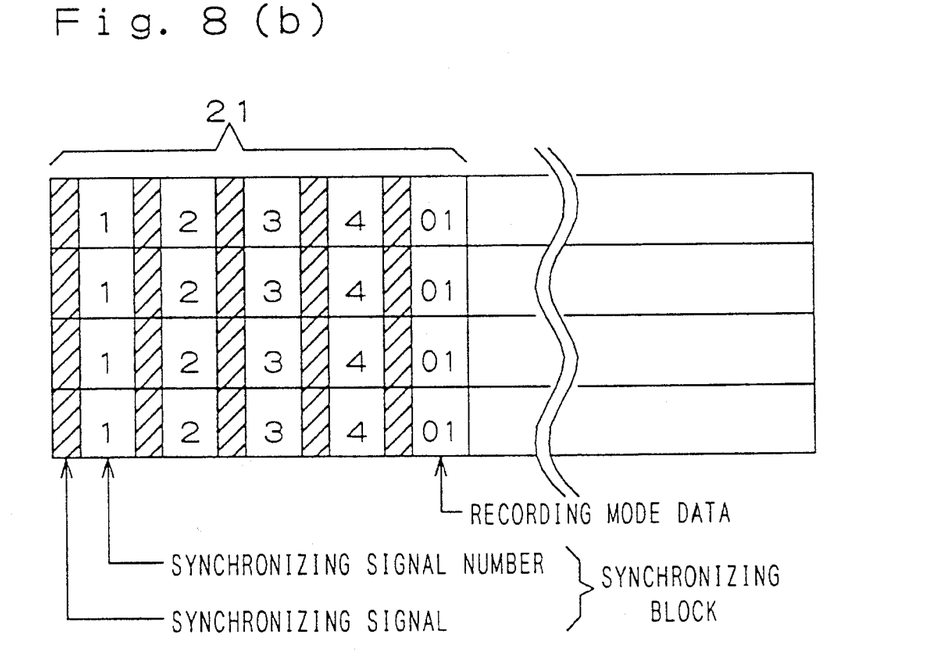

FIGS. 8(a) and (b) show constructions of the first recording area of other embodiments. In FIG. 8(a), each synchronizing block contains a synchronizing signal, a synchronizing signal number and a track number which distinguish the track from another track. In FIG. 8(b), each of the first four synchronizing blocks from the beginning contains a synchronizing signal and a synchronizing number, and only the last, fifth synchronizing block contains a synchronizing signal and a recording mode data.

Although the embodiment of the present invention explains two-channel simultaneous recording actions with the use of two magnetic heads, it is not limitative and other recording techniques will be employed with equal success.

Although the tracking pilot signals of the embodiment are two different types, they may be four different frequency type signals which are commonly used in 8-mm video systems. The assignment of the tracking pilot signals to recording areas will not be limited.

Although in the embodiment of the present invention the number of the synchronizing blocks in the first recording area in one track is five to make the explanation easy, the number is optional. If the number of synchronizing blocks contained in the first recording area increases, the editing positioning accuracy will increase.

Although in the explanation of the embodiment of the present invention the tracking control operation using the pilot signal in the first recording area of a track is used only in the editing operation, it can be used also in the reproducing operation in the same manner.

Although in the explanation of the embodiment of the present invention the recording mode data in the first recording area of a track is used only in the editing operation, the recording mode data can be used also in the reproducing operation to monitor the recording mode of the reproducing track.

Although in the explanation of the embodiment of the present invention, the synchronizing block decoder 12 outputs the synchronizing signal number which belongs to the last synchronizing block in the first recording area, any synchronizing signal number after the detected synchronizing signal can be used. In this case, the pilot sampling timing generator 13 can generate a pilot sampling signal not immediately but after a predetermined delay time when the pilot timing generator 13 receives the synchronizing signal number from the synchronizing block decoder 12.

Although in the embodiment of the present invention, the data in the synchronizing block are a synchronizing signal number, a recording mode data or a track number, the data in the synchronizing block are optional and other constructions are possible.

The present invention is not limited to a magnetic recording system but also applicable to other recording systems including optical recording.

What is claimed is:

1. An editing apparatus for editing a tape recording medium which has formed thereon a plurality of recording tracks each being divided into a plurality of recording areas including a first recording area counted from a beginning end of each recording track, the first recording area on a specific recording track of the plurality of recording tracks having recorded therein a plurality of synchronizing blocks each containing a synchronizing signal and a synchronizing signal number which indicates a sequential order of each synchronizing block in the first recording area, and adjacent recording tracks adjacent to said specific recording track at opposite sides of said specific recording track having recorded therein a pilot signal used for tracking control, said apparatus comprising:

recording information signal generating means for generating a recording information signal to be recorded for editing;

recording and reproducing means including a recording and reproducing head and operable in a first mode in which said head scans the first recording area of said specific recording track for reproducing the synchronizing blocks from the first recording area of said specific recording track and the pilot signal detected due to crosstalk from said adjacent tracks to thereby obtain a reproduced signal and in a second mode in which said head records the recording information signal in a given editing area on the recording medium;

editing control means for operating said recording and reproducing means in said first mode to obtain said reproduced signal, said editing control means further generating an editing area signal indicative of said given editing area;

synchronizing block detecting and decoding means for detecting from said reproduced signal the synchronizing signal of each of the reproduced synchronizing blocks and decoding the synchronizing signal number of each of the reproduced synchronizing blocks, and for examining a sequence of the reproduced synchronizing blocks by checking the synchronizing signal number until a specific synchronizing signal number is obtained, said synchronizing block detecting and decoding means outputting said specific synchronizing signal number when a predetermined number of synchronizing blocks have been reproduced in a predetermined sequence;

tracking error detecting means responsive to said specific synchronizing signal from said synchronizing block detecting and decoding means for sampling the reproduced pilot signal to obtain a tracking error signal indicative of a tracking error of said head;

tracking control means responsive to said tracking error signal for controlling a transfer of said recording medium to eliminate the tracking error; and editing timing generating means responsive to said specific synchronizing signal number from said synchronizing block detecting and decoding means and said editing area signal from said editing control means for generating an editing timing signal, said recording and reproducing means being responsive to said editing timing signal for operating in said second mode to record with said head the recording information signal in said editing area;

wherein each of the synchronizing blocks in the first recording area of said Specific recording track has further recorded therein a recording mode data indicative of a recording mode in which said specific recording track has been recorded, said synchronizing block detecting and decoding means further outputting a reproduced recording mode data contained in said reproduced signal, and said editing control means further outputting an edit recording mode data indicative of a recording in which the recording information signal is to be recorded, and wherein said apparatus further comprises an editing stopping means for comparing the reproduced recording mode data and the edit recording mode data and stopping editing when the reproduced recording mode data is different from the edit recording mode data.

2. An apparatus according to claim 1, wherein said tracking error detecting means includes a sampling timing generating means responsive to said synchronizing signal number from said synchronizing block detecting and decoding means for generating a sampling timing signal indicative of a timing for sampling the pilot signal, and a sampling means responsive to said sampling timing signal for sampling the reproduced pilot signal to obtain said tracking error signal.

3. An apparatus according to claim 1, wherein said adjacent recording tracks have respectively recorded therein first and second pilot signals which are different in frequency from each other, and wherein said tracking error detecting means includes filter means for extracting the first and second pilot signals from said reproduced signal, first and second amplitude detecting means for detecting amplitudes of the first and second pilot signals, respectively, and a subtracting means for obtaining an amplitude difference between outputs of the first and second amplitude detecting means to obtain said tracking error signal.

4. An editing apparatus for editing a tape recording medium which has formed thereon a plurality of recording tracks each being divided into a plurality of recording areas including a first recording area counted from a beginning end of each recording track, the first recording area on a specific recording track of the plurality of recording tracks having recorded therein a plurality of synchronizing blocks each containing a synchronizing signal and a recording mode data indicative of a recording mode in which said specific recording track has been recorded, and adjacent recording tracks adjacent to said specific recording track at opposite sides of said specific recording track having recorded therein a pilot signal used for tracking control, said apparatus comprising:

recording information signal generating means for generating a recording information signal to be recorded for editing;

recording and reproducing means including a recording and reproducing head and operable in a first mode in which said head scans the first recording area of said specific recording track for reproducing the synchronizing blocks from the first recording area of said specific recording track and the pilot signal detected due to crosstalk from said adjacent tracks to thereby obtain a reproduced signal and in a second mode in which said head records the recording information signal in a given editing area on the recording medium;

editing control means for operating said recording and reproducing means in said first mode to obtain said reproduced signal, said editing control means further generating an editing area signal indicative of said given editing area and an edit recording mode data indicative of a recording mode in which the recording information signal is to be recorded;

synchronizing block detecting and decoding means for detecting from said reproduced signal the synchronizing signal and decoding the recording mode data, said synchronizing block detecting and decoding means outputting the synchronizing signal and the recording mode data;

tracking error detecting means responsive to the synchronizing signal from said synchronizing block detecting and decoding means for sampling the reproduced pilot signal to obtain a tracking error signal indicative of a tracking error of said head;

tracking control means responsive to said tracking error signal for controlling a transfer of said recording medium to eliminate the tracking error;

editing timing generating means responsive to the synchronizing signal from said synchronizing block detecting and decoding means and said editing area signal from said editing control means for generating an editing timing signal; and editing stopping means for comparing the reproduced recording mode data with the edit recording mode data and stopping editing when the reproduced recording mode data is different from the edit recording mode data, said recording and reproducing means being responsive to said editing timing signal for operating in said second mode to record with said head the recording information signal in said editing area.

5. An apparatus according to claim 4, wherein said tracking error detecting means includes a sampling timing generating means responsive to said synchronizing signal from said synchronizing block detecting and decoding means for generating a sampling timing signal indicative of a timing for sampling the pilot signal, and a sampling means responsive to said sampling timing signal for sampling the reproduced pilot signal to obtain said tracking error signal.

6. An apparatus according to claim 4, wherein said adjacent recording tracks have respectively recorded therein first and second pilot signals which are different in frequency from each other, and wherein said tracking error detecting means includes filter means for extracting the first and second pilot signals from said reproduced signal, first and second amplitude detecting means for detecting amplitudes of the first and second pilot signals, respectively, and a subtracting means for obtaining an amplitude difference between outputs of the first and second amplitude detecting means to obtain said tracking error signal.

7. A tracking control apparatus for controlling tracking of a recording and reproducing head on a recording track on a tape recording medium which has formed thereon a plurality of recording tracks each being divided into a plurality of recording areas including a first recording area counted from a beginning end of each recording track, the first recording area on a specific recording track of the plurality of recording tracks having recorded therein a plurality of synchronizing blocks each containing a synchronizing signal and a synchronizing signal number which indicates a sequential order of each synchronizing block in the first recording area, and adjacent recording tracks adjacent to said specific recording track at opposite sides of said specific recording track having recorded therein a pilot signal used for tracking control, said apparatus comprising:

means including said recording and reproducing head for reproducing the synchronizing blocks from the first recording area of said specific recording track and the pilot signal detected due to crosstalk from said adjacent tracks to thereby obtain a reproduced signal;

synchronizing block detecting and decoding means for detecting from said reproduced signal the synchronizing signal of each of the reproduced synchronizing blocks and decoding the synchronizing signal number of each of the reproduced synchronizing blocks, and for examining a sequence of the reproduced synchronizing blocks by checking the synchronizing signal number until a specific synchronizing signal number is obtained, said synchronizing block detecting and decoding means outputting said specific synchronizing signal number when a predetermined number of synchronizing blocks have been reproduced in a predetermined sequence;

tracking error detecting means responsive to said specific synchronizing signal number from said synchronizing block detecting and decoding means for sampling the reproduced pilot signal to obtain a tracking error signal indicative of a tracking error of said head;

tracking control means responsive to said tracking error signal for controlling a transfer of said recording medium to eliminate the tracking error;

wherein each of the synchronizing blocks in the first recording area of said specific recording track has further recorded therein a recording mode data of a recording mode in which said specific recording track has been recorded, said synchronizing block detecting and decoding means further outputting a reproduced recording mode data contained in said reproduced signal, and said editing control means further outputting an edit recording mode data indicative of a recording mode in which the recording information signal is to be recorded, and wherein said apparatus further comprises an editing stopping means for comparing the reproduced recording mode data and the edit recording mode data and stopping editing when the reproduced recording mode data is different from the edit recording mode data.

8. An apparatus according to claim 7, wherein said tracking error detecting means includes a sampling timing generating means responsive to said synchronizing signal number from said synchronizing block detecting and decoding means for generating a sampling timing signal indicative of a timing for sampling the pilot signal, and a sampling means responsive to said sampling timing signal for sampling the reproduced pilot signal to obtain said tracking error signal.

9. An apparatus according to claim 7, wherein said adjacent recording tracks have respectively recorded therein first and second pilot signals which are different in frequency from each other, and wherein said tracking error detecting means includes filter means for extracting the first and second pilot signals from said reproduced signal, first and second amplitude detecting means for detecting amplitudes of the first and second pilot signals, respectively, and a subtracting means for obtaining an amplitude difference between outputs of the first and second amplitude detecting means to obtain said tracking error signal.

* * * * *